United States Patent Office 3,793,454
Patented Feb. 19, 1974

3,793,454
HARRINGTONINE AND ISOHARRINGTONINE FOR TREATING L1210 OR P388 LEUKEMIC TUMORS IN MICE
Richard G. Powell, Peoria, and Cecil R. Smith, Jr., Dunlap, Ill., assignors to the United States of America as represented by the Secretary of Agriculture
Original application Apr. 9, 1970, Ser. No. 26,995. Divided and this application Nov. 12, 1971, Ser. No. 198,443
Int. Cl. A61k 27/00
U.S. Cl. 424—274
3 Claims

ABSTRACT OF THE DISCLOSURE

Alkaloids found to be chemotherapeutically active against leukemic strains L1210 and P388 in mice are produced from *Cephalotaxus harringtonia*. The process includes extraction of plant parts with a polar solvent, partitioning the plant extracts between nonpolar and acidic aqueous solvents, making the aqueous portion basic, and removing the crude alkaloids from the basic aqueous solution. The crude alkaloids are purified and used in the treatment of mice implanted with leukemic strains L1210 and P388.

---

Figure 1:
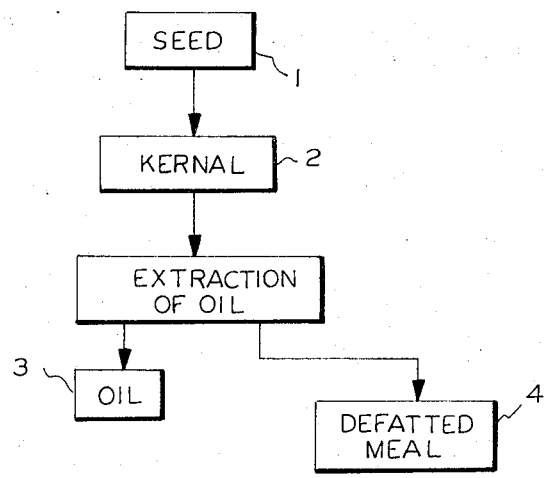

A nonexclusive, irrevocable, royalty-free license in the invention herein described, throughout the world for all purposes of the United States Government, with the power to grant sublicenses for such purposes, is hereby granted to the Government of the United States of America.

This is a division, of application Ser. No. 26,995 filed Apr. 9, 1970.

BACKGROUND OF THE INVENTION

This invention relates to two novel alkaloids, harringtonine and isoharringtonine, and has their production as its primary object. A secondary object is to provide chemotherapeutic agents for the remission of L1210 and P388 leukemia in mice. Mice implanted with leukemic strains L1210 and P388 and treated with the instant compounds show a remarkable increase in survival time over untreated leukemic mice.

The search for compounds that are useful in cancer chemotherapy has been vigorous but positive results have been relatively few [Chem. Eng. News 44(51): 64–68 (1966); Agr. Res., July 1966, pp. 3–4; Amer. Hort. Mag. 47: 336–337 (1968)].

Alkaloids have been found in several species of *Cephalotaxus*, and it has been shown that cephalotaxine is the major alkaloid in most of the species studied [Paudler et al., J. Org. Chem. 28: 2194–2197 (1963)]. However, cephalotaxine has been shown to be inactive toward the L1210 and P388 strains of leukemia.

Briefly, in accordance with the invention, the inventors produced chemotherapeutically active alkaloids from *C. harringtonia* by the following procedure:

(a) Ground defatted seed or other plant parts are extracted with 95 percent alcohol or its equivalent in order to obtain a solution of the desired materials.
(b) The extract solution is then concentrated to about 5 percent of the original volume.
(c) The concentrated extract solution is then partitioned between an approximately 1 to 1 mixture of chloroform and 6 percent aq. tartaric acid, and the two layers are separated.
(d) Base is added to the tartaric acid solution to change the pH to about 9 as measured by pH paper.
(e) The basic aqueous solution is then extracted with chloroform, and a crude alkaloid mixture is obtained.
(f) the crude mixture of alkaloids is subjected to a series of separation procedures which include countercurrent distribution (CCD), thin-layer chromatography (TLC), and column chromatography (CC). These procedures result in the collection of several fractions, each of which will contain from one to several alkaloids.
(g) The final isolation step is to purify the individual compound, i.e., harringtonine or isoharringtonine, by TLC.

The preferred separation is to start with a CCD of from 10 to 200 individual extractions in a chloroform-pH 5 aqueous buffer solvent system, followed by either preparative TLC or CC. Harringtonine and isoharringtonine are both easily purified by TLC.

The secondary object, remission of L1210 and P388 leukemic tumors in mice, is accomplished by intraperitoneal injections of harringtonine or isoharringtonine in saline or its equivalent. Several routes of treatment were tried and the results were tabulated (see Example 3). The preferred route was to inject the animal, starting 24 hours after tumor implant, once a day for 9 days.

The optimum daily dosage for harringtonine against L1210 was determined to be from 0.2 to 1 mg. of alkaloid per kilogram of animal body weight. In one test, a 2 mg./kg. dose proved to be toxic. A 1 mg./kg. dose gave the highest survival time. Harringtonine administered in a total dosage of from 2 to 12 mg./kg. of animal weight over a period of from 1 to 9 days was effective against leukemia strain P388. One and two milligrams per day gave the same survival time without toxic effect. Dosages for isoharringtonine were 5 to 10 mg./kg. per day against leukemia strain L1210 and 3 to 12 mg./kg. per day against strain P388 with no toxic effect.

The above-stated objects will be further clarified in the detailed description and the examples to follow.

DETAILED DESCRIPTION OF THE INVENTION

Figure 2:
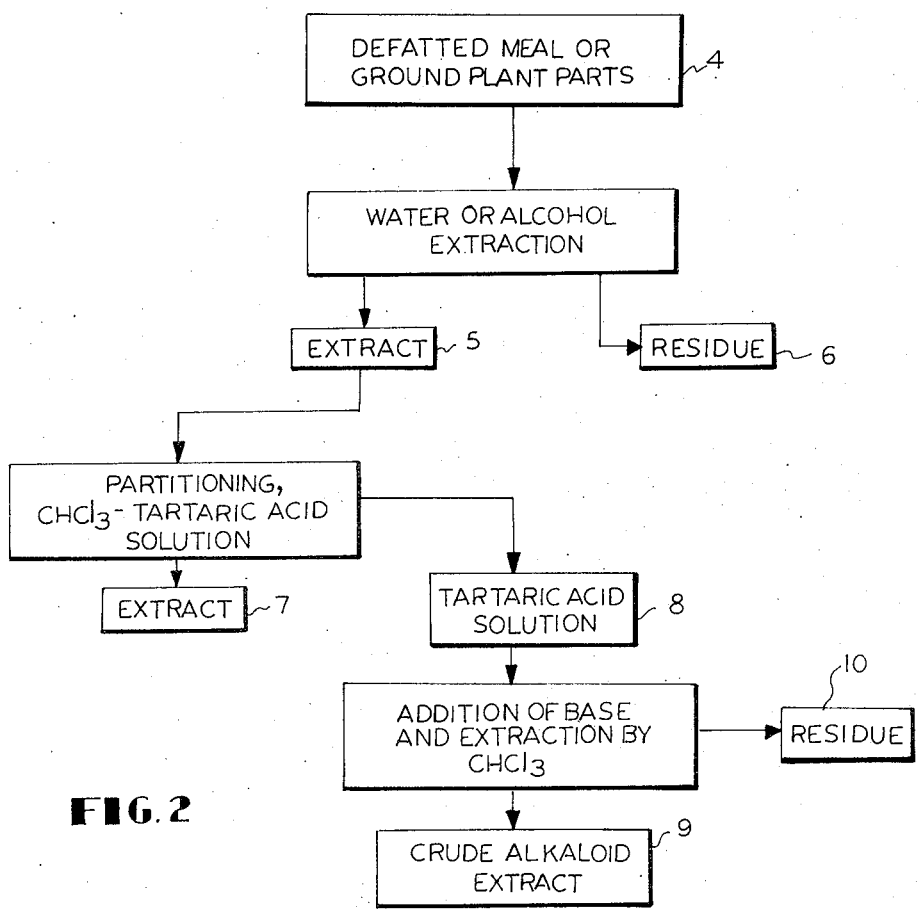
Figure 3:
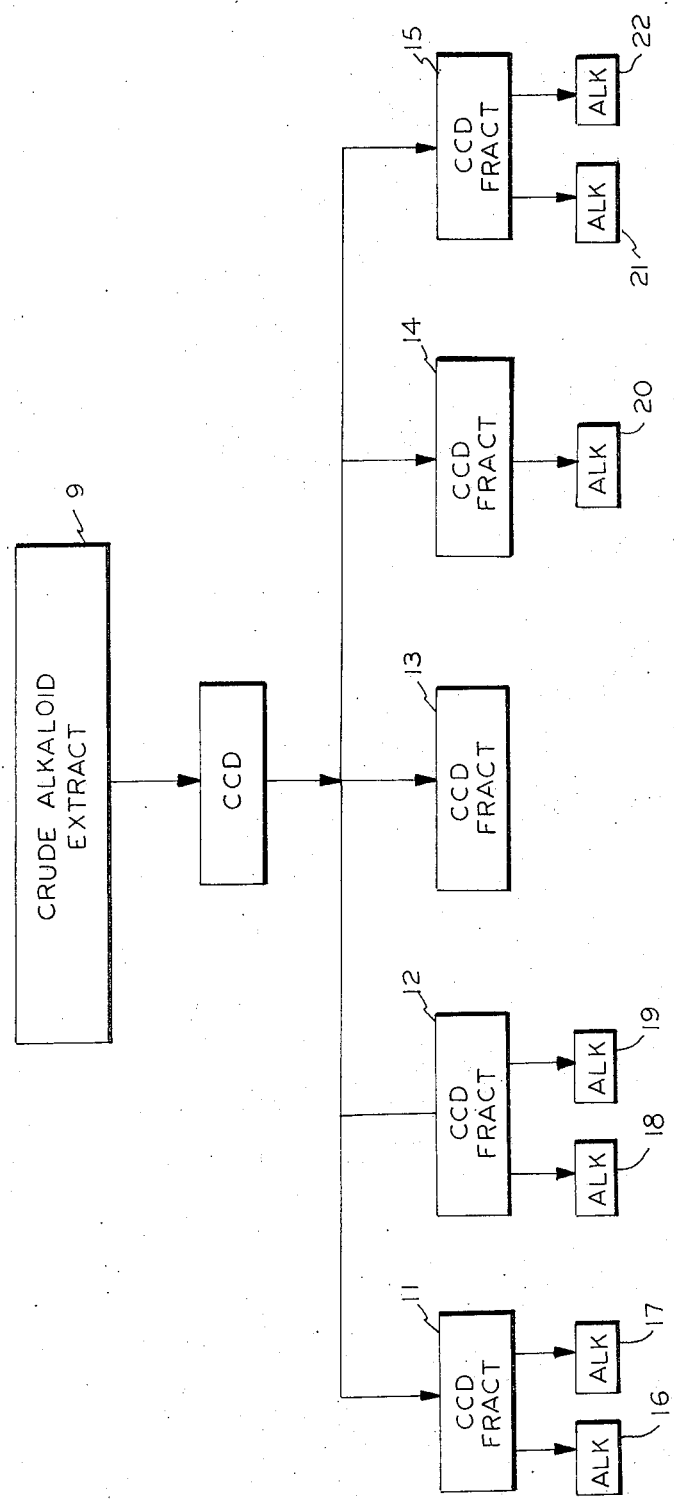

FIGS. 1, 2, and 3 of the accompanying drawings are flow diagrams or fractionation trees describing the method of obtaining chemotherapeutically active alkaloid compounds from the seed or plant parts of *Cephalotaxus harringtonia*.

Starting with a quantity of seed 1, FIG. 1, the hull is removed by standard methods leaving ground seed kernel 2 from which the oil is extracted with a nonpolar solvent. The seed oil 3, which is not pertinent to the instant invention, was stored for future use. Dried defatted meal or ground plant parts 4, FIG. 2, are subjected to extraction with a polar solvent (i.e., water, alcohol, mixtures of water and alcohol, or any equivalent solvent which will dissolve the alkaloids) yielding extract 5 and residue 6. Residue 6 is discarded and extract 5 is concentrated to approximately 5 percent of its original volume and partitioned between two immiscible solvents, one of which must be an acidic aqueous solution and the other a polar solvent capable of dissolving the material not soluble in the aqueous acid layer. However, the preferred partitioning system is chloroform and 6 percent aqueous tartaric acid solution which has a pH of about 2. Any acidic solution would be suitable for this extraction. However, the alkaloids are labile to low pH, e.g., mineral acid, so an organic acid such as tartaric or citric is preferred. Materials collected from the chloroform extract 7 contain no basic alkaloids and are discarded. A sufficient amount of base is added to the tartaric acid solution 8 to increase the pH to 9–10, as determined by pH paper. Ammonia or $Na_2CO_3$ is preferred because of cost and convenience. When the crude alkaloids dissolved in the aqueous acid solvent of the partitioning system are made basic, they become soluble in chloroform which is used to extract them from the now basic aqueous solution. The chloroform solution is dried and evaporated to yield extract 9, a chemotherapeutically active crude mixture of basic alkaloids.

Separation and purification of the alkaloids, harringtonine and isoharringtonine, could be accomplished by any of innumerable combinations of CCD, CC, and TLC. Either of the alkaloids could be isolated from the crude mixture by TLC alone. However, this would be very inefficient as it would necessitate a large plurality of TLC plates to obtain a useful amount of any individual alkaloid.

The problem of efficiently obtaining the individual alkaloids was solved by a preliminary separation by CCD, FIG. 3, having a chloroform lower phase and an upper phase consisting of pH 5, McIlvaine's standard buffer solution (Handbook of Chemistry and Physics, 39th ed., Chemical Rubber Co., Cleveland, Ohio, p. 1615). Countercurrent distribution is preferred because it is capable of fractionating much larger samples than any of the other methods.

The pH of the buffer is rather critical. If the aqueous solution of the CCD is more acidic than about pH 4, all components move together with the buffer, and if the pH is more alkaline than pH 6, there is essentially no movement of the samples components with the aqueous phase and no separation.

Using analytical TLC as a guide, the individual fractions from the CCD of the crude alkaloid mixture are combined to give 11, 12, and 13, each of which are mixtures of two distinct (by TLC) compounds; extract 15, a mixture of at least five compounds; and extract 14, which is essentially a single alkaloid. Further separation and purification is accomplished by either preparative TLC or CC. Essentially pure alkaloids 16, 17, 18, 19, and 20 are obtained by preparative TLC of 11, 12, and 14. Column chromatography fractionates 15 into two separate mixtures of alkaloids, 21 and 22. No further fractionation of extract 13 was attempted.

Chemotherapeutic activity of each compound or mixture, 13, 16–22, was determined in mice which were implanted with either of two types of leukemia cells, lymphoid or lymphocytic, strain L1210 or P388, respectively. Starting 24 hours after the tumor implantation, previously determined dosages of each compound are injected intraperitoneally once a day for 9 days. Survival time of treated leukemic mice is compared to that of untreated leukemic mice (T/C×100), Table 1. A survival time of 100 percent indicates no activity. A T/C of greater than 100 percent means that the treated mice are surviving longer than the control mice, and the compound used for treatment is actively retarding the progress of the cancer.

Table 1 shows that compounds 18 and 20 were active toward each leukemia strain. Fraction 13, known to be a mixture, showed activity which was found to be due to the presence of compound 18.

Compounds 18 and 20 were named harringtonine and isoharringtonine, respectively, and their structures were determined.

The major alkaloid of *C. harringtonia*, Table 2, was shown to be cephalotaxine by comparing the results of analysis by the inventors on their isolate 16 to those obtained on a known sample of pure cephalotaxine, Tables 3–7.

TABLE 1

| Alkaloid | Dose, mg./kg. | Leukemia strain | Survival time, percent (T/C) |
|---|---|---|---|
| 9 | 20 | L1210 | 127 |
| 16 | 50 | L1210 | 103 |
| 17 | 60 | L1210 | 100 |
| 18 | 1.0 | L1201 | 132 |
| 18 | 1.0 | P388 | 147 |
| 19 | 50 | L1210 | 112 |
| 20 | 5 | L1210 | 116 |
| 21 | 25 | L1210 | 88 |
| 22 | 25 | L1210 | 94 |
| 13 | 6 | L1210 | 129 |
| 13 | 6 | P388 | 147 |

TABLE 2

| Alkaloid | Percent total alkaloids recovered [1] |
|---|---|
| 16 | 43 |
| 18 | 9 |
| 19 | 22 |
| 20 | 4 |
| Others | 22 |

[1] Analysis is from one accession. Percentages vary somewhat from one accession to another.

TABLE 3

| Compound 16 | | | Cephalotaxine | | |
|---|---|---|---|---|---|
| δ (p.p.m.) | Multiplicity | J (Hz.) | δ (p.p.m.) | Multiplicity | J (Hz.) |
| 6.65 | 1 | | 6.63 | 1 | |
| 6.6 | 1 | | 6.60 | 1 | |
| 5.86 | 1 | | 5.90 | 1 | |
| 4.89 | 1 | | 4.85 | 1 | |
| 4.70 | 2 | 9.2 | 4.71 | 2 | 9 |
| 3.70 | 1 | | 3.67 | 1 | |
| 3.63 | 2 | 9.2 | 3.62 | 2 | 9 |

TABLE 4

| | Relative intensities,[1] percent | |
|---|---|---|
| M/e | Compound 16 | Cephalotaxine |
| 28 | 24.6 | 42.9 |
| 44 | 10.5 | 3.6 |
| 77 | 12.4 | 15.1 |
| 103 | 9.7 | 11.5 |
| 110 | 10.8 | 12.5 |
| 115 | 15.7 | 18.2 |
| 126 | 9.5 | 11.4 |
| 128 | 9.8 | 11.8 |
| 137 | 26.1 | 30.8 |
| 149 | 12.7 | 15.2 |
| 150 | 23.3 | 27.0 |
| 161 | 9.0 | 10.4 |
| 166 | 36.0 | 42.3 |
| 214 | 19.3 | 21.2 |
| 228 | 11.7 | 13.0 |
| 229 | 10.5 | 11.3 |
| 254 | 14.8 | 16.0 |
| 266 | 9.1 | 10.2 |
| 272 | 16.6 | 18.3 |
| 282 | 13.3 | 13.2 |
| 284 | 67.0 | 74.2 |
| 285 | 14.8 | 16.4 |
| 298 | 57.5 | 62.2 |
| 299 | 12.2 | 12.7 |
| 300 | 53.8 | 54.0 |
| 301 | 10.1 | 10.8 |
| 314 | 22.6 | 23.9 |
| 315 | 99.9 | 99.9 |
| 316 | 19.9 | 20.8 |

[1] All relative intensity values of about 10 and above are included.

TABLE 5

| Compound 16 | | Cephalotaxine | |
|---|---|---|---|
| $\lambda_{max.}$ (mµ) | Log ε | $\lambda_{max.}$ (mµ) | Log ε |
| 290 | 3.64 | 290 | 3.55 |
| 260 | 2.75 | 260 | 2.79 |
| 238 | 3.56 | 238 | 3.56 |

TABLE 6

| | Calculated | Found |
|---|---|---|
| Compound 16—Anal. ($C_{18}H_{21}NO_4$, M.W. 315): | | |
| C | 68.5 | 68.7 |
| H | 6.72 | 7.04 |
| N | 4.44 | 4.32 |
| O | 20.3 | 20.0 |
| $OCH_3$ | 9.84 | 10.1 |
| Cephalotaxine—Anal. ($C_{18}H_{21}NO_4$): | | |
| C | 68.5 | 68.5 |
| H | 6.72 | 6.90 |
| N | 4.44 | 4.34 |
| O | 20.3 | 20.2 |
| $OCH_3$ | 9.84 | 10.01 |

TABLE 7

| Wavelength (μ) | Compound 16 Percent transmittance | Cephalotaxine, Percent transmittance |
|---|---|---|
| 2.75 | 70 | 69 |
| 3.39 | 34 | 28 |
| 3.42 | 37 | 32 |
| 3.54 | 46 | 43 |
| 4.15 | 88 | 88 |
| 5.40 | 91 | 94 |
| 5.78 | 83 | 86 |
| 6.07 | 17 | 13 |
| 6.20 | 70 | 66 |
| 6.70 | 48 | 38 |
| 6.77 | 11 | 6 |
| 6.88 | 53 | 49 |
| 6.91 | 51 | 47 |
| 7.00 | 60 | 57 |
| 7.05 | 63 | 63 |
| 7.37 | 48 | 44 |
| 7.46 | 42 | 38 |
| 7.51 | 55 | 52 |
| 7.62 | 61 | 59 |
| 7.89 | 25 | 20 |
| 8.64 | 50 | 42 |
| 8.99 | 28 | 24 |
| 9.25 | 32 | 27 |
| 9.42 | 28 | 23 |
| 9.66 | 7 | 4 |
| 9.80 | 46 | 42 |
| 10.12 | 66 | 64 |
| 10.70 | 32 | 26 |
| 11.10 | 71 | 71 |
| 11.45 | 55 | 52 |
| 11.70 | 66 | 66 |

NOTE.—IR's of both samples are superimposable.

The partial structure assigned to cephalotaxine by Paudler et al., supra, is:

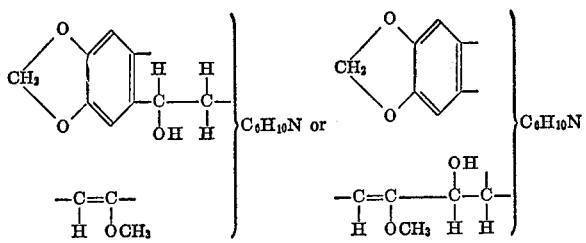

NMR studies, Table 3, show that the complete structures must be either:

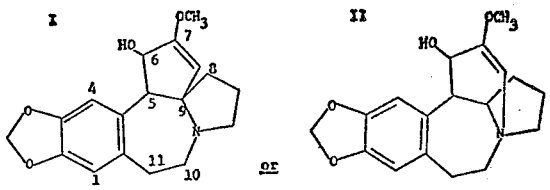

(Structures as drawn in this specification are not intended to indicate the stereochemistry of the compounds they represent and should not limit any compound herein to a specific structural configuration.)

The NMR spectrum contains two singlets, each equal to one proton, at δ6.65 and δ6.61. These peaks are assigned to para aromatic protons adjacent to oxygen functions ($H_1$ and $H_4$). A peak with an area equivalent to two protons is observed at δ5.86 in the spectrum of cephalotaxine. This peak and an infrared band at 10.7μ, Table 7, are characteristic of protons in methylenedioxy groups attached to an aromatic ring. The spectrum contains an olefinic proton resonance as a singlet at δ4.89 ($H_8$). The absence of coupling means that there are no vicinal protons. A low field doublet appears at δ4.70 ($H_6$), and this proton is coupled to one whose signal appears at δ3.63 ($H_5$, $J_{5,6}=9.2$ Hz). Upon acetylation of cephalotaxine, the δ4.70 doublet moves downfield to δ5.80, a change of 1.10 p.p.m., which shows the proton is attached to the same carbon atom as a hydroxyl function. The position of the methoxyl resonance at δ3.70 shows that it is attached to an unsaturated carbon; this assignment is supported by a strong infrared band at 6.07μ. The final structure of cephalotaxine was determined by single crystal X-ray diffraction studies of cephalotaxine methiodide. The derivative was prepared by reacting 0.303 gram of cephalotaxine with 6 ml. of methyliodide for 1 hour. After evaporating the reaction mixture to dryness, the white solid cephalotaxine methiodide, 0.471 gram, was recrystallized from methanol to give a crystalline material that analyzed as follows:

*Analysis.*—Calcd. for $C_{19}H_{24}NO_4I$ (M.W. 457): C, 49.90; H, 5.29; I, 27.75%. Found: C, 50.00; H, 5.51; I, 27.78%.

A single crystal analyzed by an automatic diffractometer shows lattice parameters of: $a=9.225$; $b=11.456$; $C=19.569$ A and $\beta=100°36'$. A density of $D_m=1.53$, determined by flotation, corresponds to four molecules per unit cell. The above data indicate a space group of $P2_1/n$.

Intensities from 1.729 independent reflections were used to obtain relative structure factors. The sharpened, three-dimensional Patterson synthesis obtained from the normalized relative structure factors plainly showed the position of the iodide molecules. A fused five- and seven-membered ring system is evident when a difference synthesis is plotted with the contribution from the iodine atoms removed. When the fused ring system is removed in a subsequent difference synthesis, the final structure of cephalotaxine is elucidated as being I (p. 14).

STRUCTURE OF ALKALOIDS

Compounds 16, 18, and 20 were subjected to IR, UV, NMR, and MS. Compound 16 has already been shown to be cephalotaxine.

Infrared spectra were obtained for each alkaloid in a chloroform solution. Compounds 18 and 20 have essentially superimposable spectra which contain a fairly broad band due to hydroxyl at 2.80μ with a shoulder at 2.70μ while cephalotaxine has a single sharp band at 2.75μ. A strong band at 5.77μ due to ester carbonyl in 16 is absent in cephalotaxine, while all contain a strong band at about 9.6μ and a broad band at 10.7μ which are characteristic of a methylenedioxyphenyl grouping. Further evidence of the methylenedioxyphenyl group in alkaloids 18 and 20 is obtained by comparing their UV spectra with that of cephalotaxine which is known to contain this chromophore, Table 8.

TABLE 8

| Alkaloid | $\lambda_{max.}$ (mμ) | Log ε | $\lambda_{min}$ (mμ) | Log ε | $\lambda_{max.}$ (mμ) | Log ε |
|---|---|---|---|---|---|---|
| 16 | 290 | 3.64 | 260 | 2.75 | 238 | 3.56 |
| 18 | 287.5 | 3.70 | 259 | 3.26 | 231 | 3.80 |
| 20 | 289 | 3.62 | 261 | 2.78 | 238 | 3.58 |

Mass spectroscopic analysis shows that Compounds 18 and 20 have a base peak at m/e 298 which corresponds to the molecular ion peak ($C_{28}H_{37}NO_9$, M+, m/e 531) minus ($C_{10}H_{17}O_6$). Known samples of acetyl cephalotaxine and cephalotaxine also have a peak at m/e 298 which corresponds to (M+—$C_2H_3O_2$) and (M+—OH); respectively. Accumulated data from IR, UV, and MS indicating that Compounds 18 and 20 are esters of cephalotaxine is further substantited by comparing NMR data from cephalotaxine with that from the two compounds, Table 9.

TABLE 9

| Compound | δ[1] | | | | | | |
|---|---|---|---|---|---|---|---|
| | $H_1$ | $H_4$ | $H_5$ | $H_6$ | $H_8$ | O\O / $CH_2$ | $OCH_3$ |
| Cephalotaxine | 6.65 | 6.61 | 3.63 | 4.70 | 4.89 | 5.86 | 3.70 |
| 18 | 6.61 | 6.54 | 3.77 | 5.99 | 5.07 | 5.85 | 3.68 / [2] 3.57 |
| 20 | 6.67 | 6.54 | 3.78 | 6.03 | 5.09 | 5.83 | 3.68 / [2] 3.60 |

[1] Spin decoupling used to verify assignment. $H_1$, $H_4$, etc., refer to ester structure III below.
[2] The esters contain a second methoxy group in the R portion.

III

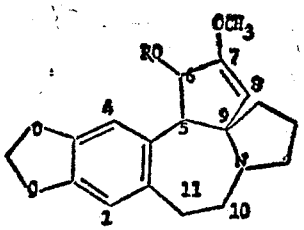

In order to characterize the ester portion of the alkaloids, they were transmethylated in the following manner:

TABLE 10

| Alkaloid: | Wt. (g.) | Time (hr.) | Temperature | Volume of 0.5 M sodium methoxide (ml.) |
|---|---|---|---|---|
| 18 | 0.254 | 1 | Reflux | 5 |
| 20 | 0.253 | 2 | 50° C | 5 |

Ethyl ether (40 ml.) was added to each reaction mixture which was then washed four times with 10-ml. portions of 5 percent aqueous acetic acid and once with distilled water. The aqueous portion was made strongly basic and extracted with chloroform. The remaining aqueous portion was acidified and extracted with ethyl ether which was combined with the original ether layer. Each of the two chloroform extracts, 70–75 percent of the total recovered weight, containing an alkaloid which was shown to be cephalotaxine by the fact that IR, UV, NMR, and MS data from the two alkaloids were identical with those of known sample of cephalotaxine. As an illustrative example of this identity, UV and melting point data are recorded in Table 11.

TABLE 11

| | M.P. ° C. (uncorr.) | λmax. (mμ) | Log ε | λmin. (mμ) | Log ε | λmax. (mμ) | Log ε |
|---|---|---|---|---|---|---|---|
| Source of cephalotaxine: | | | | | | | |
| 18 | 135–136.5 | 290 | 3.61 | 260 | 2.73 | 238 | 3.54 |
| 20 | 135–136.5 | 290 | 3.62 | 260 | 2.65 | 238 | 3.53 |
| Cephalotaxus | 136–137.5 | 290 | 3.64 | 260 | 2.75 | 238 | 3.56 |

For purposes of simplification, the dimethyl ester products from the transmethylation of alkaloids 18 and 20 will henceforth be labeled 18–1 and 20–1, respectively. Infrared analyses of these products show strong bands in the region assigned to hydroxyl groups.

Mass spectroscopy of 18–1, using an excessive sample pressure method, gave a (M$^+$+1) peak at m/e 249 which responds to a (M$^+$) ion mass or molecular weight of 248 ($C_{11}H_{20}O_6$). When it is considered that the transmethylation added one methyl group to each molecular specie, the MS data for 18–1 agrees exactly with MS data for alkaloid 18; i.e., cephalotaxine esterified with 18–1 would give a compound having a molecular formula ($C_{28}H_{37}O_9$) and a MW of 531. Ester 20–1 did not give a (M$^+$+1) peak. However, the largest MS peak from 20–1, m/e 189, corresponds to (M$^+$−59) from a compound with a molecular weight of 248, having lost a ($CO_2CH_3$) fragment.

TABLE 12

| 18–1 | | 20–1 | |
|---|---|---|---|
| M/e | Fragment | M/e | Fragment |
| 231 | | 189 | ($C_9H_{17}O_4$) |
| 215 | ($C_{10}H_{15}O_5$) | 99 | ($C_5H_{11}O$) |
| 171 | ($C_9H_{15}O_3$) | 90 | ($C_3H_6O_3$) |
| 155 | ($C_8H_{11}O_3$) | 81 | |
| 99 | ($C_5H_7O_2$) | 71 | |
| 97 | ($C_6H_9O$) | { 59 43 | |

The fractionation pattern of 20–1, Table 12, indicates that it has a somewhat different structure than 18–1.

The final assignment of structure for the two ester fractions, 18–1 and 20–1, was determined by NMR, Table 13.

TABLE 13

| Ester | H₁ | H₂ | H₃ | H₄ | H₅ | H₆ | H₇ | Assignment |
|---|---|---|---|---|---|---|---|---|
| 18–1 | 1.19 | 1.25–1.90 | 1.95 | 2.80 | 3.64 | 3.77 | 3.95 | ③ OH ⑦ OH<br>② \| ② \| ④ ⑧<br>(CH₃)₂—C—(CH₂)₂—C—CH₂—CO₂CH₃<br>\|<br>CO₂CH₃<br>⑥ |
| Multiplicity | 6H, s | 4H, m | 1H, s | 2H, q | 3H, s | 3H, s | 1H, s | |
| 20–1 | 0.87 | 1.10–2.20 | 3.33 | | 3.73 | 3.79 | 4.35 | ④ ④ OH OH<br>① ② \| \| ⑥<br>(CH₃)₂—CH—(CH₂)₂—C——CH—CO₂CH<br>\|<br>CO₂CH₃<br>⑥ |
| Multiplicity | 6H, d | 5H, m | 2H, s | | 3H, s | 3H, s | 1H, s | |

NMR studies on 20–1 also show that this compound has a different structure than 18–1. The one proton singlet at δ4.35 was shown to be an isolated proton on a carbon bearing a hydroxyl group since it shifts up field to δ5.44 when the compound is partially acetylated.

In accordance with the analysis given above, the general structure of the novel chemotherapeutic agents is the one shown as III (page 17).

In alkaloid 18, harringtonine, the ester portion "R," after being removed by transmethylation, has the structure:

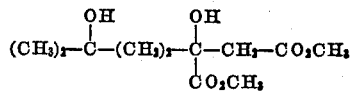

In alkaloid 20, isoharringtonine, the product formed by transmethylation has the structure:

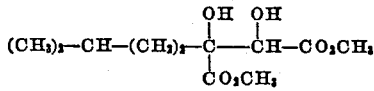

EXAMPLE 1

Extraction of Alkaloids from *C. harringtonia*.—*Cephalotaxus harringtonia* seeds 990 grams, were put through cracking rolls to loosen the hull from the kernel. A hand separation of kernels from hulls yielded 547 grams of kernels which were then ground to finer particles so that a more facile extraction of oil could be achieved. After a few hours of extraction with pentane-hexane solvent in a Soxhlet extractor followed by evaporation of the solvent, 271 grams of oil were obtained. The oil-free meal was air dried and allowed to stand overnight in 600 ml. of 95 percent ethanol, after which the meal was filtered and extracted five more times with 300-ml. portions of 95 percent ethanol. The combined ethanol extracts were concentrated to a volume of 100 ml. and diluted with 1 liter of 6 percent aqueous tartaric acid solution. Four 200-ml. portions of chloroform were used to wash the aqueous tartaric acid solution. After washing, the aqueous solution was adjusted to pH 9 by adding solid sodium carbonate. Ten grams of a crude alkaloid mixture 9, were obtained by extracting the basic solution four times with 200 ml. chloroform and evaporating to dryness the combined extracts. The crude alkaloid mixture was dissolved in 400 ml. of pH 5 McIlvaine's buffer and 400 ml. of chloroform, all of which was divided evenly between the first 10 tubes of a 200-tube countercurrent distribution apparatus, Model No. C-3, H. O. Post Scientific Instrument Company, Inc. Forty milliliters of chloroform lower phase were placed in each of the remaining 190 tubes. The machine was set to automatically deliver 40 ml. of pH 5 buffer upper phase into the system at each transfer, shake for several minutes, then rest for 5 minutes. This cycle continued for 190 transfers. The contents of each tube were made basic, pH 9–10 by adding sodium carbonate, and extracted twice with chloroform. After the chloroform was dried and the residue weighed, the residues were combined as follows:

TABLE 14

|  | Wt. (g.) | Fraction number (Fig. 2) |
|---|---|---|
| Tube number: |  |  |
| 11–40 | 2.5 | 15 |
| 41–70 | 0.8 | 14 |
| 71–100 | 0.4 | 13 |
| 101–135 | 1.6 | 12 |
| 136–195 | 3.8 | 11 |

Fraction 12 was spotted on five standard TLC plates prepared from silica gel 1 ml. thick and developed with 15 percent methanol in chloroform. The bands were visualized by covering all but 1 cm. along the plate's edge with an $I_2$ impervious covering and placing the covered plate in an $I_2$ chamber. The position of the bands were marked and the exposed 1-cm. strip discarded. Two bands were obtained from the five TLC's; the band which traveled the farthest being labeled fraction (or alkaloid) 19, the other fraction (or alkaloid) 18.

Fraction 11 was subjected to the same TLC procedure as fraction 12 and resulted in the separation of alkaloids 16 and 17. Alkaloid 20 was obtained in the same manner from fraction 14. Fraction 15 was separated into fractions 21 and 22 on a column of 50 grams of a commercially available silicic acid by successively percolating through the column 130 ml. chloroform, 180 ml. 25 percent methanol in chloroform, and 200 ml. 50 percent methanol in chloroform. These two fractions, however, were chemotherapeutically inactive and where discarded. Fraction 13 was active, but subsequent investigation showed that its activity was due to the presence of 18.

EXAMPLE 2

Starting with 12.2 grams of crude alkaloid fraction 9, which was obtained from 1,500 grams of C. harringtonia seeds in essentially the same manner as in Example 1, a 10-plate countercurrent distribution in 1-liter flasks yielded the following 10 fractions:

|  | G. |
|---|---|
| a | 0.35 |
| b | 0.29 |
| c | 0.39 |
| d | 0.19 |
| e | 0.19 |
| f | 0.46 |
| g | 1.03 |
| h | 1.53 |
| i | 2.49 |
| j | 5.02 |
| Recovery | 12.10 |

Fractions a and b contained a mixture of alkaloids as analyzed by TLC but were not examined further. The following table shows the methods of purification and yields of alkaloids from the remaining fractions.

TABLE 15

| Fractions: | Method of purification | Pure alkaloids (grams) | | | |
|---|---|---|---|---|---|
|  |  | 16 | 18 | 19 | 20 |
| c + d + e | Prep. TLC [1] |  | 0.04 |  | 0.33 |
| f | Prep. TLC |  | 0.10 | 0.22 | 0.02 |
| g | Prep. TLC |  | 0.27 | 0.60 |  |
| h | Prep. TLC |  | 0.40 | 0.94 |  |
| i | Col. chromo.[2] | 1.02 |  | 0.32 |  |
| j | Col. chromo. | 2.76 |  |  |  |
| Total |  | 3.78 | 0.81 | 2.08 | 0.35 |

[1] Same as Example 1.
[2] Column chromatograph carried out on 100 g. of Brockman grade III neutral alumina, eluted with 350 ml. benzene, followed by 200 ml. ethyl ether.

Analysis of these four alkaloids by IR, NMR, MS, and GLC showed them to be essentially pure compounds.

EXAMPLE 3

Mice implanted with either lymphoid leukemia L1210 or lymphocytic leukemia P388 were divided into groups of 10 for treatment with harringtonine. Similar groups of leukemic mice were left untreated, and the survival time (T/C) in days was computed. Treatment was given by intraperitoneal injection of harringtonine in saline solutin. The schedule of treatment and the results are given in Table 16.

TABLE 16

|  | Dose each treatment, mg./kg.[1] | Total dose, mg./kg.[1] | T/C, percent |
|---|---|---|---|
| Schedule: |  |  |  |
| Against P388 leukemia: |  |  |  |
| Once, day 1 | 2 | 2 | 131 |
| Q3H, day 1 | 0.5 | 4 | 172 |
| QD, day 1–9 | 1 | 9 | 240 |
| Q4D, day 1, 5, 9 | 2 | 6 | 154 |
| Q3H, Q4D, day 1, 5, 9 | 0.5 | 12 | 236 |
| Q8D, day 1, 9 | 2 | 4 | 131 |
| Q3H, Q8D, day 1, 9 | 0.25 | 4 | 163 |
| Against L1210 leukemia: |  |  |  |
| QD, day 1–9 | 1 | 9 | 186 |
| Q3H, Q4D, day 1, 5, 9 | 1 | 24 | 130 |

[1] Milligrams of alkaloid per kilogram of animal body weight.

NOTE.—Q3H=every 3 hours; QD=every day; Q4D=every 4 days, etc.

The optimum scheduling (i.e., intraperitoneal injection once a day for 9 days) was used to treat mice implanted with either leukemic strain L1210 or P388, and survival time (T/C) was computed, Table 17.

TABLE 17

| Alkaloid | Leukemia strain | Dose, mg./kg. | T/C, percent |
|---|---|---|---|
| Harringtonine | L1210 | 2 | Toxic |
| | L1210 | 1 | 132 |
| | L1210 | 0.5 | 123 |
| | L1210 | 0.2 | 125 |
| | P388 | 2 | 147 |
| | P388 | 1 | 147 |
| | P388 | 0.5 | 142 |
| | P388 | 0.2 | 126 |
| Isoharringtonine | L1210 | 20 | 115 |
| | L1210 | 10 | 116 |
| | L1210 | 5 | 116 |
| | P388 | 12 | 209 |
| | P388 | 6 | 183 |
| | P388 | 3 | 139 |

We claim:

1. A method of treating mice for remission of leukemic tumors of the strains L1210 or P388 which have been implanted in said mice comprising: administering to said mice by intraperitoneal injection an effective amount of an active compound selected from the group consisting of harringtonine and isoharringtonine.

2. The method of claim 1 in which harringtonine is administered in total dosage of from 2 to 12 mg./kg. of animal weight over a period of from 1 to 9 days.

3. The method of claim 1 in which isoharringtonine is administered in a daily dosage of from 3 to 20 mg./kg. of animal weight for a period of 9 days.

References Cited

Powell et al., Tetrahedran Letters, No. 46, pp. 4081–4084, October 1969.

JEROME D. GOLDBERG, Primary Examiner